US008885610B2

(12) United States Patent
Yokota

(10) Patent No.: US 8,885,610 B2
(45) Date of Patent: Nov. 11, 2014

(54) COMMUNICATION CONTROL DEVICE, RADIO COMMUNICATION DEVICE, COMMUNICATION CONTROL METHOD AND RADIO COMMUNICATION METHOD

(75) Inventor: Tomoyoshi Yokota, Yokohama (JP)

(73) Assignee: Kyocera Corporation, Kyoto (JP)

( * ) Notice: Subject to any disclaimer, the term of this patent is extended or adjusted under 35 U.S.C. 154(b) by 1637 days.

(21) Appl. No.: 12/294,882

(22) PCT Filed: Mar. 28, 2007

(86) PCT No.: PCT/JP2007/056736
§ 371 (c)(1),
(2), (4) Date: Jun. 24, 2010

(87) PCT Pub. No.: WO2007/111357
PCT Pub. Date: Oct. 4, 2007

(65) Prior Publication Data
US 2010/0254307 A1    Oct. 7, 2010

(30) Foreign Application Priority Data
Mar. 28, 2006   (JP) ................................ 2006-089135

(51) Int. Cl.
H04W 4/00 (2009.01)
H04W 36/00 (2009.01)
H04W 28/16 (2009.01)
H04W 60/00 (2009.01)
H04W 80/04 (2009.01)

(52) U.S. Cl.
CPC .......... *H04W 36/0011* (2013.01); *H04W 28/16* (2013.01); *H04W 60/005* (2013.01); *H04W 80/04* (2013.01)
USPC .......................................................... 370/332

(58) Field of Classification Search
None
See application file for complete search history.

(56) References Cited

U.S. PATENT DOCUMENTS

| 6,801,767 | B1 * | 10/2004 | Schwartz et al. | ........... 455/426.2 |
| 6,850,503 | B2 | 2/2005 | Dorenbosch et al. | |
| 6,937,582 | B1 * | 8/2005 | Kronestedt | .................... 370/329 |
| 7,009,936 | B1 * | 3/2006 | Kangas et al. | ................. 370/229 |
| 2002/0119783 | A1 * | 8/2002 | Bourlas et al. | ................. 455/453 |

(Continued)

FOREIGN PATENT DOCUMENTS

CN   1692346 A   11/2005
JP   09312869 A   12/1997

(Continued)

OTHER PUBLICATIONS

Extended European Search Report issued for Application No. 07740174.3 dated Sep. 20, 2011 cites the U.S. Application Publication Numbers above.

(Continued)

*Primary Examiner* — Gregory Sefcheck
*Assistant Examiner* — Joshua Smith
(74) *Attorney, Agent, or Firm* — DLA Piper LLP (US)

(57) ABSTRACT

A switching server 100 determines whether or not to switch a network for an uplink from a radio IP network 10A to a radio IP network 10B, on the basis of an acquired communication quality of the uplink. In addition, when determining to switch the network for the uplink to the radio IP network 10B, the switching server 100 transmits, to an MN 300, an uplink switching instruction to switch the network for the uplink to the radio IP network 10B.

10 Claims, 9 Drawing Sheets

(56) References Cited

U.S. PATENT DOCUMENTS

| | | |
|---|---|---|
| 2004/0142657 A1* | 7/2004 | Maeda .................... 455/11.1 |
| 2004/0147263 A1* | 7/2004 | Schwarz et al. ............ 455/436 |
| 2005/0018613 A1 | 1/2005 | Yokota |
| 2005/0185653 A1 | 8/2005 | Ono et al. |
| 2006/0056365 A1* | 3/2006 | Das et al. ................. 370/338 |
| 2006/0083238 A1* | 4/2006 | Lee et al. ................. 370/389 |
| 2006/0218298 A1* | 9/2006 | Knapp et al. .............. 709/238 |

FOREIGN PATENT DOCUMENTS

| | | |
|---|---|---|
| JP | 10004580 A | 1/1998 |
| JP | 2002198891 A | 7/2002 |
| JP | 2004129024 A | 4/2004 |
| WO | 2004013998 A2 | 2/2004 |

OTHER PUBLICATIONS

Chinese language office action dated Feb. 24, 2011 and its English language translation for corresponding Chinese application 200780011405.3 cites the relevance of foreign patents document listed above.

C. Perkins "IP Mobility Support (RFC2002)" IETF internet article (http://www.ietf.org/rfc/rfc2002.txt), pp. 1-79, Oct. 1996.

International Search report for corresponding PCT application PCT/JP2007/056736 lists the references above.

\* cited by examiner

FIG. 9

| | THRESHOLD 1 | THRESHOLD 2 | THRESHOLD 3 | THRESHOLD 4 | N | M | K |
|---|---|---|---|---|---|---|---|
| RADIO IP NETWORK 10A | 80 | 70 | 50 | 40 | 10 | 3 | 5 |
| RADIO IP NETWORK 10B | 70 | 60 | 50 | 40 | 10 | 2 | 4 |
| ... | ... | ... | ... | ... | ... | ... | ... |
| RADIO IP NETWORK n | 80 | 70 | 50 | 35 | 10 | 3 | 5 |

| | SINR | DRC | TRANSMISSION POWER | DRC_Lock | RSSI |
|---|---|---|---|---|---|
| RADIO IP NETWORK 10A | Thresh_SINR_11 | Thresh_DRC_11 | Thresh_Tx_Power_11 | Thresh_DRC_Lock_11 | Thresh_RSSI_11 |
| | Thresh_SINR_12 | Thresh_DRC_12 | Thresh_Tx_Power_12 | Thresh_DRC_Lock_12 | Thresh_RSSI_12 |
| ... | ... | ... | ... | ... | ... |
| RADIO IP NETWORK n | Thresh_SINR_n1 | Thresh_DRC_n1 | Thresh_Tx_Power_n1 | Thresh_DRC_Lock_n1 | Thresh_RSSI_n1 |
| | Thresh_SINR_n2 | Thresh_DRC_n2 | Thresh_Tx_Power_n2 | Thresh_DRC_Lock_n2 | Thresh_RSSI_n2 |

(b)

| | RSSI |
|---|---|
| RADIO IP NETWORK 10B | Thresh_RSSI_21 |
| | Thresh_RSSI_22 |
| ... | ... |
| RADIO IP NETWORK m | Thresh_RSSI_m1 |
| | Thresh_RSSI_m2 |

COMMUNICATION CONTROL DEVICE, RADIO COMMUNICATION DEVICE, COMMUNICATION CONTROL METHOD AND RADIO COMMUNICATION METHOD

CROSS-REFERENCE TO RELATED APPLICATIONS

This application is a national stage of international application no. PCT/JP2007/056736, filed on Mar. 28, 2007, and claims the benefit of priority under 35 USC 119 of Japanese patent application no. 2006-089135, filed on Mar. 28, 2006. The entire contents of these applications are incorporated herein by reference.

TECHNICAL FIELD

The present invention relates to a communication control device, a radio communication device, a communication control method and a radio communication method for executing communications via a radio IP network by use of a care of IP address.

BACKGROUND ART

In a radio communication network in which a group of internet protocols (IPs) is used (hereinafter, referred to as a "radio IP network" as appropriate), so-called Mobile IP is defined in order to improve the mobility of a radio communication device (refer to Non-Patent Document 1, for example).

In Mobile IP, a care of IP address (Care of Address) dynamically assigned to a radio communication device in accordance with a position of the radio communication device is used.

Non-patent literature 1: C. Perkins, "IP Mobility Support (RFC2002)," [online], October 1996, IETF, [retrieved on Mar. 15, 2006], (Internet URL: http://www.ietf.org/rfc/rfc2002.txt)

DISCLOSURE OF THE INVENTION

In recent years, an environment where a radio communication device is allowed to use multiple radio IP networks (such as a cellular phone network and a wireless LAN network) has been provided.

However, there are the following problems if a radio communication device uses multiple radio IP networks in accordance with aforementioned Mobile IP. Specifically, in Mobile IP, care of IP addresses are assigned to a radio communication device in respective radio IP networks. Since the radio communication device is capable of using only a single care of IP address assigned thereto by any one of the radio IP networks, the radio communication device cannot use the multiple radio IP networks "simultaneously."

In other words, different radio IP networks cannot be used in the uplink and the downlink. In the radio IP networks, particularly, communication qualities, such as communication bandwidths (communication speeds), delay times, and jitters, are often different between the uplink and the downlink, when compared with a case of a wired IP network. For this reason, it has been desired that only the radio IP network for one of the links with a deteriorated communication quality can be switched to another radio IP network. Accordingly, the present invention is made in view of the foregoing circumstance. Thus, an object of the present invention is to provide a communication control device, a radio communication device, a communication control method, and a radio communication method, with which only the network for one of an uplink and a downlink can be switched to another radio IP network when multiple radio IP networks are used.

To solve the foregoing problem, the present invention has the following aspects. Firstly, a first aspect of the present invention is summarized as a communication control device (switching server 100) that controls a communication path to a radio communication device by use of a first radio IP network (radio IP network 10A) in which a first care of IP address (care of IP address A1) is dynamically assigned to the radio communication device (MN 300) in accordance with a position of the radio communication device, and of a second radio IP network (radio IP network 10B) in which a second care of IP address (care of IP address A2) is assigned to the radio communication device. The communication control device comprises: a relay unit (packet relay unit 105) configured to receive, from the radio communication device, an IP packet including the first care of IP address and being transmitted to a communication destination (IP phone terminal 42) via the first radio IP network or an IP packet including the second care of IP address and being transmitted to the communication destination via the second radio IP network, and to relay the received IP packets to the communication destination; an uplink communication quality acquiring unit (communication quality acquiring unit 108) configured to acquire a communication quality of the first radio IP network in the uplink which is from the radio communication device to the communication control device; an uplink switching determination unit (main controller 111) configured to determine whether or not to switch the network for the uplink from the first radio IP network to the second radio IP network on the basis of the communication quality acquired by the uplink communication quality acquiring unit; and an uplink switching instruction transmitter (main controller 111) configured to transmit, to the radio communication device, a uplink switching instruction to switch the network for the uplink from the first radio IP network to the second radio IP network when the uplink switching determination unit determines that the network for the uplink is to be switched to the second radio IP network.

According to such a communication control device, only the network for the uplink is switched from the first radio IP network to the second radio IP network on the basis of the communication quality of the uplink. In addition, the relay unit can handle the IP packet including the first care of IP address and the IP packet including the second care of IP address. Accordingly, communications can be executed by simultaneously using the both radio IP networks of the first radio IP network and the second radio IP network.

That is, according to such a communication control device, the network for only one of the uplink and the downlink can be switched to another radio IP network in a case where multiple radio IP networks are used.

A second aspect of the present relates to the first aspect of the present invention and is summarized as a communication control device further comprising a downlink switching instruction receiver (communication interface unit 101 and main controller 111) configured to receive, from the radio communication device, a downlink switching instruction to switch a network for the downlink, which is from the communication control device to the radio communication device, from the first radio IP network to the second radio IP network, a downlink silence detector (silence detector 107) configured to detect a silent state in which communications are not executed in the downlink, on the basis of the IP packet received by the relay unit from, the communication destination, and a downlink switching unit (main controller 111) configured to switch the network for the downlink from the first radio IP network to the second radio IP network on the basis of the downlink switching instruction received by the downlink switching instruction receiver. In the communication control device, the downlink switching unit switches the network for the downlink from the first radio IP network to the second radio IP network while the downlink silence detector is detecting the silent state.

A third aspect of the present invention relates to the second aspect of the present invention and is summarized as a communication control device in which the first radio IP network uses a first voice encoding protocol (for example, G.729) used for coding a voice signal, and the downlink switching unit changes the first voice encoding protocol to a second voice encoding protocol (for example, G.711) used in the second radio IP network when the network for the downlink is switched from the first radio IP network to the second radio IP network.

A fourth aspect of the present invention is summarized as a radio communication device (MN 300) that executes communications with a communication destination (IP phone terminal 42) via a communication control device (switching server 100) by use of a first radio IP network (radio IP network 10A) in which a first care of IP address (care of IP address A1) is dynamically assigned to the radio communication device in accordance with a position of the radio communication device and a second radio IP network (radio IP network 10B) in which a second care of IP address (care of IP address A2) is assigned to the radio communication device. The radio communication device comprises: a first radio communication unit (radio communication card 301) configured to transmit, to the communication control device via the first radio IP network, an IP packet including the first care of IP address and being addressed to the communication destination; a second radio communication unit (radio communication card 303) configured to transmit, to the communication control device via the second radio IP network, an IP packet including the second care of IP address and being addressed to the communication destination; a downlink communication quality acquiring unit (communication quality acquiring unit 308) configured to acquire a communication quality of the first radio IP network in the downlink from the communication control device to the radio communication device; a downlink switching determination unit (main controller 311) configured to determine whether or not to switch the network for the downlink from the first radio IP network to the second radio IP network on the basis of the communication quality acquired by the downlink communication quality acquiring unit; and; and a downlink switching instruction transmitter (main controller 311) configured to, transmit to the communication control device, a downlink switching instruction to switch a network for the downlink from the first radio IP network to the second radio IP network when the downlink switching determination unit determines that the network for the downlink is to be switched to the second radio IP network.

A fifth aspect of the present invention relates to the fourth aspect of the present invention and is summarized as a radio communication device in which the second radio communication unit is set in a dormant state in which transmission and reception of a radio signal is stopped at timing other than predetermined timing, the downlink switching determination unit determines whether or not to switch the network for the downlink from the first radio IP network to the second radio IP network, by use of a first communication quality deterioration condition and a second communication quality deterioration condition which is used to determine whether or not to switch from the link via the first radio IP network to the link via the second radio IP network, in response to a state of poorer communication quality than in the first communication quality deterioration condition, and the downlink switching instruction transmitter cancels the dormant state of the second radio communication unit when the downlink switching determination unit determines that the communication quality meets the first communication quality deterioration condition.

A sixth aspect of the present invention is summarized as a radio communication device (MN 300) that executes communications with a communication destination (IP phone terminal 42) via a communication control device (switching server 100) by use of a first radio IP network (radio IP network 10A) in which a first care of IP address (care of IP address A1) is dynamically assigned to the radio communication device in accordance with a position of the radio communication device and a second radio IP network (radio IP network 10B) in which a second care of IP address (care of IP address A2) is assigned to the radio communication device. The radio communication device further comprises: an uplink switching instruction receiver (radio communication card 303 and main controller 311) configured to receive, from the communication control device, an uplink switching instruction to switch a network for an uplink which is from, the radio communication device to the radio controller from the first radio IP network to the second radio IP network; an uplink silence detector (silence detector 307) configured to detect a silent state in which communications are not executed in the uplink; and an uplink switching unit (main controller 311) configured to switch the network for the uplink from the first radio IP network to the second radio IP network on the basis of the uplink switching instruction received by the uplink switching instruction receiver. In the radio communication device, the uplink switching unit switches the network for the uplink from the first radio IP network to the second radio IP network while the uplink silence detector is detecting the silent state.

A seventh aspect of the present invention relates to the sixth aspect of the present invention and is summarized as a radio communication device in which the first radio IP network uses a first voice encoding protocol (G.729) for coding a voice signal and the uplink switching unit changes the first voice encoding protocol to a second voice encoding protocol (G.711) used in the second radio IP network when the network for the uplink is switched from the first radio IP network to the second radio IP network.

An eighth aspect of the present invention relates to the sixth aspect of the present invention and is summarized as a radio communication device in which the second radio communication unit is set in a dormant state in which transmission and reception of a radio signal are stopped at timing other than predetermined timing, the uplink switching instruction receiver receives a communication quality deterioration notification which is received before receiving the uplink switching instruction, and the uplink switching unit cancels the dormant state of the second radio communication unit, when the uplink switching instruction receiver received the communication quality deterioration notification.

A ninth aspect of the present invention is summarized as a communication control method that controls a communication path with a radio communication device by use of a first radio IP network in which a first care of IP address is dynamically assigned to the radio communication device in accordance with a position of the radio communication device and a second radio IP network in which a second care of IP address is assigned to the radio communication device. The communication control method comprises the steps of: receiving from the radio communication device, an IP packet including the first care of IP address and being transmitted to a communication destination via the first radio IP network, or an IP packet including the second care of IP address and being transmitted to the communication destination via the second radio IP network, and then relaying the received IP packet to the communication destination; acquiring a communication quality of the first radio IP network for an uplink which is from the radio communication device to the communication control device; determining whether or not to switch the network for the uplink from the first radio IP network to the second radio IP network on the basis of the acquired communication quality; and transmitting, to the radio communication device, an uplink switching instruction to switch the network for the uplink from the first radio IP network to the second radio IP network when it is determined that the network for the uplink is to be switched to the second radio IP network.

A tenth aspect of the present invention is summarized as a radio communication method for executing communications with a communication destination via a communication control device by use of a first radio IP network in which a first care of IP address is dynamically assigned in accordance with a position of the radio communication device and a second radio IP network in which a second care of IP address is assigned. The radio communication method comprises the steps of: transmitting, to the communication control device via the first radio IP network, an IP packet including the first care of IP address and being addressed to the communication destination; transmitting, to the communication control device via the second IP network, an IP packet including the second care of IP address and being addressed to the communication destination; acquiring a communication quality of the first radio IP network for a downlink which is from the communication control device to the radio communication device; determining whether or not to switch a network for the downlink from the first radio IP network to the second radio IP network on the basis of the acquired communication quality; and transmitting, to the communication control device, a downlink switching instruction to switch the network for the downlink from the first radio IP network to the second radio IP network when it is determined that the network for the downlink is to be switched to the second radio IP network. An eleventh aspect of the present invention is summarized as a radio communication method for executing communications with a communication destination via a communication control device by use of a first radio IP network in which a first care of IP address is dynamically assigned in accordance with a position and a second radio IP network in which a second care of IP address is assigned. The radio communication method comprises the steps of: receiving, from the communication control device, an uplink switching instruction to switch a network for an uplink, which is from the radio communication device to the communication control device, from the first radio IP network to the second radio IP network; detecting a silent state in which communications are not executed in the uplink; and switching the network for the uplink from the first radio IP network to the second radio IP network on the basis of the received uplink switching instruction while the silent state is being detected.

According to the aspects of the present invention, in a case where multiple radio IP networks are used, there can be provided a communication, control device, a radio communication device, a communication control method, and a radio communication method, in which a network for only one of an uplink and a downlink can be switched to another radio IP network.

BRIEF DESCRIPTION OF THE DRAWINGS

FIG. 9 is a view showing one example of a threshold for determining the deterioration of the communication quality used in the communication control device according to the embodiment of the present invention.

FIG. 10 is a view showing one example of a threshold for determining the deterioration of the communication quality used in the radio communication device according to the embodiment of the present invention.

BEST MODES FOR CARRYING OUT THE INVENTION

Figure 1:
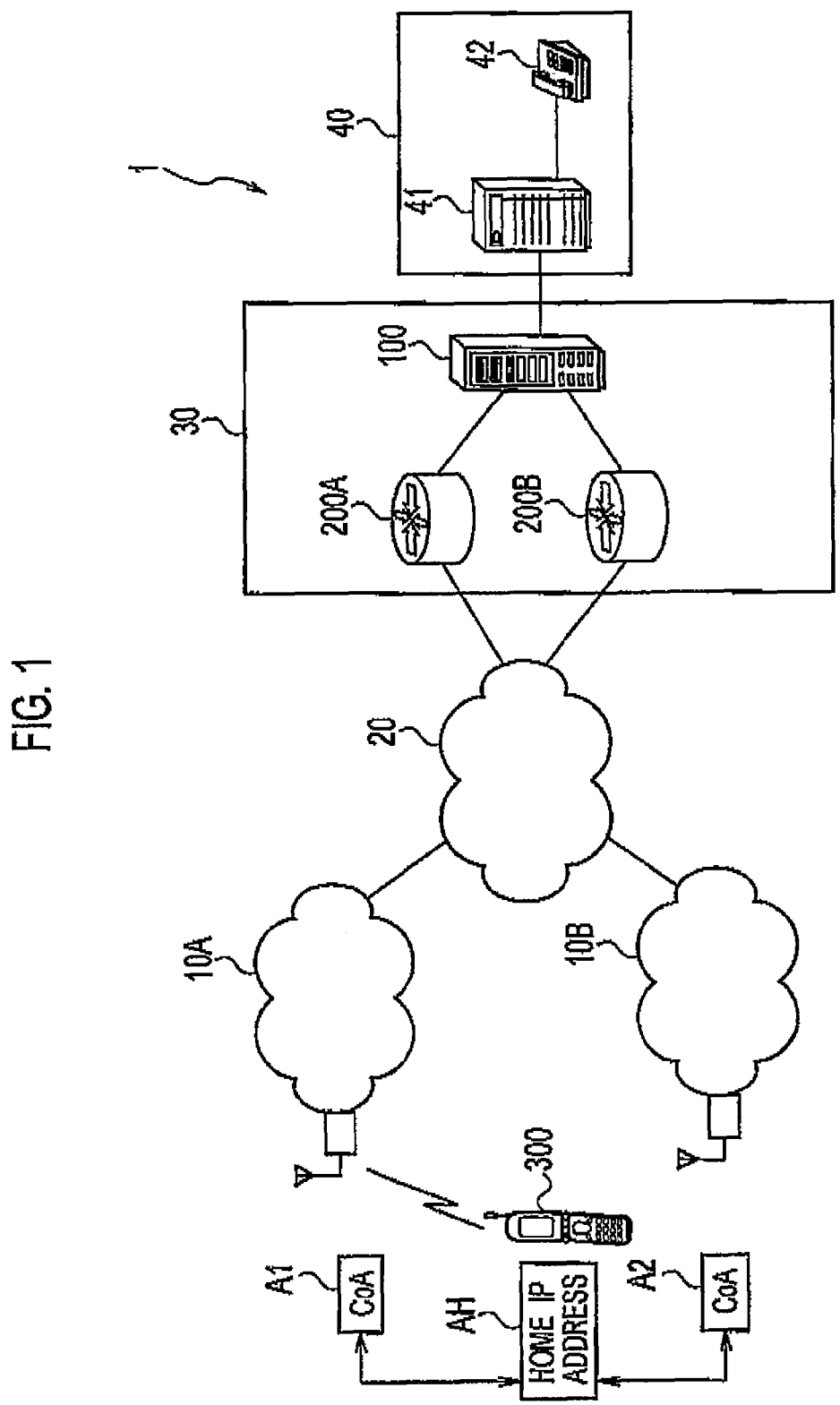
FIG. 1 shows an overall schematic configuration diagram of a communication system according to an embodiment of the present invention.

Next, an embodiment of the present invention will be described. Note that the same or similar portions are denoted by the same or similar reference numerals in the descriptions in the drawings below. It should be noted that the drawings are schematic, and that ratios of respective dimensions and the like differ from those in reality.

Accordingly, specific dimensions and the like should be determined in consideration of the descriptions below. As a matter of course, some of the dimensional relations and ratios differ in the drawings as well.

(Overall Schematic Configuration of Communication System)

FIG. 1 shows an overall schematic configuration diagram of a communication system 1 according to an embodiment of the present invention. As shown in FIG. 1, the communication system 1 includes a radio IP network 10A and a radio IP network 10B. The radio IP network 10A (a first radio IP network) is an IP network capable of transmitting IP packets. In the radio IP network 10A, a care of IP address A1 (a first care of IP address) is dynamically assigned to a cellular phone terminal 300 (hereinafter, referred to as an MN 300, as appropriate) in accordance with a position of the MN 300. In this embodiment, the radio IP network 10A is a cellular phone network employing CDMA (in particular, HRPD, which is a 3GPP2 standard) as the radio communication scheme.

The radio IP network 10B (a second radio IP network) is also capable of transmitting IP packets similarly to the radio IP network 10A. In the radio IP network 10B, a care of IP address A2 (a second care of IP address) is assigned to the MN 300. In this embodiment, the radio IP network 10B employs Mobile WiMAX compliant with the IEEE 802.16e standard as the radio communication scheme.

In addition, in the radio IP network 10A and the radio IP network 10B, VoIP packets in which voice signals are converted to IP packets are transmitted. Note that, the radio IP network 10A using a CDMA and the radio IP network 10B using a mobile WiMAX are different in CODEC (voice encoding protocol) which is used for encoding voice signals. Specifically, ITU-T G.729 is used in the radio IP network 10A, and ITU-T G.711 is used in the radio IP network 10B.

Here, the care of IP address A1 is provided from the radio IP network 10A when the MN 300 is connected to the radio IP network 10A. Likewise, the care of IP address A2 is provided from the radio IP network 10B when the MN 300 is connected to the radio IP network 10B.

In addition, in this embodiment, the care of IP address A1 and the care of IP address A2 are associated with a home IP address AH.

Moreover, a switching server 100 and the MN 300 are capable of executing communications while using the radio IP network 10A and the radio IP network 10B simultaneously.

Specifically, the switching server 100 and the MN 300 start communications by use of the radio IP network 10A in both links of the uplink (link from, the MN 300 to the switching server 100) and the downlink (link from the switching server 100 to the MN 300). If a communication quality of the uplink or the downlink is deteriorated after starting the communications, the switching server 100 and the MN 300 switch the network for only the link with the deteriorated communication quality from the radio IP network 10A to the radio IP network 10B.

The radio IP network 10A and the radio IP network 10B are connected to an Internet 20. In addition, a relay center 30 is connected to the Internet 20.

In the relay center 30, a network device that relays IP packets transmitted and received by the MN 300 is provided. Specifically, the switching server 100, and VPN routers 200A and 200B are provided in the relay center 30.

The switching server 100 controls communication paths to the MN 300. In this embodiment, the switching server 100 constitutes a communication control device. Specifically, the switching server 100 is capable of transmitting IP packets to the MN 300 via the radio IP network 10A or the radio IP network 10B.

The VPN routers 200A and 200B execute routing processing for IP packets. In addition, each of the VPN routers 200A and 200B establishes a tunnel with a VPN (IPSec) between the MN 300 and the switching server 100. The visualization of a third OSI layer is implemented by the establishment of the tunnel, and the IP mobility of the MN 300 is thereby secured.

Specifically, in this embodiment, unlike Mobile IP (RFC2002, for example) that can not communicate with multiple radio IP networks simultaneously, the MN 300 is capable of executing communications with, a communication destination (in particular, an IP phone terminal 42) while simultaneously using both of the communication paths respectively set via the radio IP network 10A and the radio IP network 10B.

The relay center 30 (the switching server 100) is connected to a user premises 40 via a predetermined wired communication network (not shown). An IP phone switching system 41 and the IP phone terminal 42 are provided in the user premises 40. The IP phone switching system 41 relays IP packets (VoIP packets, to be specific) between the predetermined wired communication network and the IP phone terminal 42. The IP phone terminal 42 mutually converts voice signals and VoIP packets, and also transmits and receives IP packets.

In other words, the MN 300 executes communications with the IP phone terminal 42 (the communication destination) via the switching server 100, in this embodiment.

(Functional Block Configuration of Communication System)

Next, a functional block configuration of the communication system 1 will be described. Specifically, descriptions will be given of functional block configurations of the switching server 100 and the MN 300 included in the communication system 1. Note that portions related to the present invention will be mainly described, hereinafter. Accordingly, it is to be noted that there is a case where each of the switching server 100 and the MN 300 includes a logical block (such as a power supply) required to perform functions as the device although such a logical block is not shown in the drawings, or the description thereof is omitted.

(1) Switching Server 100

Figure 2:
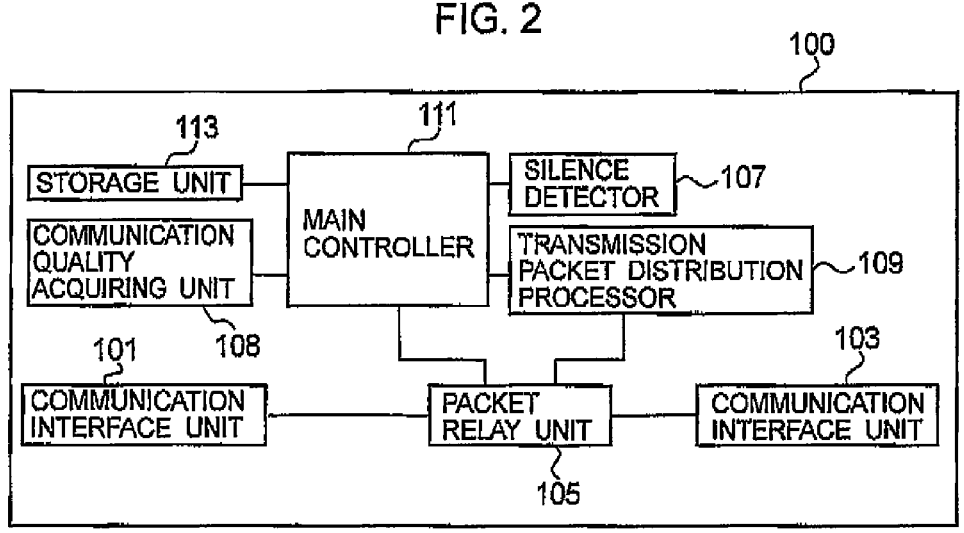
FIG. 2 shows a functional block configuration diagram of a communication control device according to the embodiment of the present invention.

FIG. 2 shows a functional block configuration diagram of the switching server 100. As shown in FIG. 2, the switching server 100 includes a communication interface unit 101, a communication interface unit 103, a packet relay unit 105, a silence detector 107, a communication quality acquiring unit 108, a transmission packet distribution processor 109, a main controller 111 and a storage unit 113.

The communication interface unit 101 is connected to the VPN router 200A and the VPN router 200B. The communication interface unit 101 can be configured of 1000 BASE-T defined by IEEE802.3ab, for example.

Figure 8:
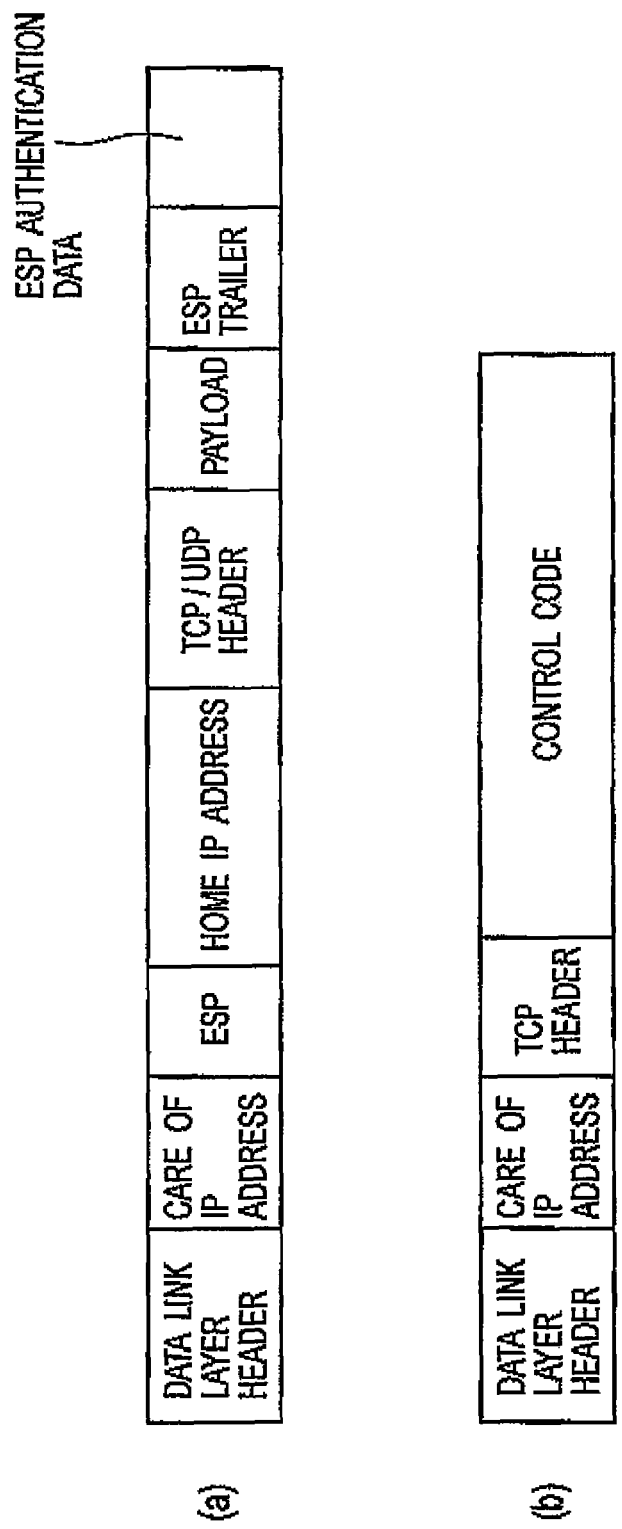
FIG. 8 is a configurational diagram of an IP packet according the embodiment of the present invention.

Moreover, as described above, in this embodiment, a VPN using IPSec is set, so that an IP packet to be transmitted and received by the communication interface unit 101, that is, a VoIP packet to be transmitted and received between the switching server 100 and the MN 300 (a VoIP packet to be transmitted by the MN 300, to be more specific) includes a configuration shown in FIG. 8(a). As shown in FIG. 8(a), a home IP header (a home IP address AH), a TCP/UDP header and a payload are encapsulated, and a care of IP address (the care of IP address A1 or the care of IP address A2) is added thereto.

Note that an access control packet to be transmitted and received between the switching server 100 and the MN 300 includes a configuration shown in FIG. 8(b). The access control packet is configured of a data link layer header, a care of IP address, a TCP header and a control code. Note that a description of the control code will be given later in detail.

The communication interface unit 103 is used in the execution of communications between the IP phone switching system 41 and the IP phone terminal 42.

The packet relay unit 105 has a buffer, and relays IP packets which are transmitted from and received by the communication interface unit 101 and communication interface unit 103. Specifically, the packet relay unit 105 relays IP packets according to an instruction of the transmission packet distribution processor 109 or the main controller 111.

In particular, in this embodiment, the packet relay unit 105 includes a care of IP address A1, and receives IP packets transmitted to an IP phone terminal 42 via the radio IP network 10A from the MN 300, and relays the received IP packets to the IP phone terminal 42. In addition, the packet relay unit 105 includes a care of address A2, and receives IP packets transmitted to the IP phone terminal 42 via the radio IP network 10B from the MN 300, and relays the received IP packets to the IP phone terminal 42. In this embodiment, the packet relay unit 105 constitutes a relay unit.

The silence detector 107 detects a silent state in which communications are not executed in the downlink on the basis of the IP packets (specifically, VoIP packets) received by the packet relay unit 105 from the IP phone terminal 42. In this embodiment, the silence detector 107 constitutes a downlink silence detector.

The silence detector 107 detects the silent state on the basis of an interval of receiving the VoIP packets received by the packet relay unit 105 from the IP phone terminal 42. Specifically, the silence detector 107 starts a timer when the packet relay unit 105 receives the VoIP packets from the IP phone terminal 42 and measures a time until receiving the next packets. The silence detector 107 restarts the timer every time the VoIP packets are received.

When the interval of receiving the VoIP packets measured by the timer becomes a predetermined threshold (Thresh_frame_n) or more, the silence detector 107 determines the state as a silent state. Mote that, the silence detector 107 does not restart the timer when receiving VoIP packets silently-compressed by CNG (Comfort Noise Generation) method.

In addition, in this embodiment, the predetermined threshold (Thresh_frame_n) used for detecting a silent state is defined for every frame time (n) of the CODEC (voice encoding protocol) used in the IP phone terminal 42. For example, if the frame time is 20 ms, 100 ms can be used as the predetermined threshold (Thresh_frame_n) because a major delay or jitter is not caused in a wired communication network between the relay center 30 and the user premises 40, different from the radio IP network 10A or the radio IP network 10B.

The communication quality acquiring unit 108 acquires the communication quality of the radio IP network 10A in the uplink. In this embodiment, the Communication quality acquiring unit 108 constitutes an uplink communication quality acquiring unit.

Specifically, the communication quality acquiring unit 108 acquires statistical information (for example, packet loss, throughput, receiving interval, and under run count and over run count of the buffer provided to the packet relay unit 105) on the communication quality of the IP packets received by the packet relay unit 105 via the communication interface unit 101.

The transmission packet distribution processor 109 executes processing for distributing IP packets, which are transmitted from the communication interface unit 101 via the packet relay unit 105, to one of the radio IP network 10A and the radio IP network 10B.

Specifically, the transmission packet distribution processor 109 adds a care of IP address A1 to the IP packets including a home IP address AH, which are received from the IP phone terminal 42 on the basis of an instruction from the main controller 111. The IP packets to which the care of IP address A1 is added are transmitted from the communication interface unit 101 to the radio IP network 10A. In addition, the transmission packet distribution processor 109 adds a care of IP address A2 to the IP packets including the home IP address AH, which are received from the IP phone terminal 42 on the basis of an instruction from the main controller 111. The IP packets to which the care of IP address A2 is added are transmitted from the communication interface unit 101 to the radio IP network 10B.

The main controller 111 controls the communication paths of IP packets to be transmitted to the MN 300 and IP packets to be received from the MN 300. Moreover, the main controller 111 executes processing for an access control packet.

In particular, in the present embodiment, the main controller 111 determines whether or not to switch the network for the uplink from the radio IP network 10A to the radio IP network 10B on the basis of the communication quality of the uplink acquired by the communication quality acquiring unit 108. In this embodiment, the main controller 111 constitutes an uplink switch determination unit.

Specifically, the main controller 111 determines whether or not to switch the network for the uplink from the radio IP network 10A to the radio IP network 10B on the basis of conditions shown in Tables 1 and 2.

TABLE 1

|  | Threshold 1 | Threshold 2 | Threshold 3 | Threshold 4 | N | M | K |
| --- | --- | --- | --- | --- | --- | --- | --- |
| Communication Quality Deterioration Level 1 | 70 | 60 | 50 | 35 | 10 | 2 | 3 |
| Communication Quality Deterioration Level 2 | 80 | 70 | 50 | 40 | 10 | 3 | 5 |

TABLE 2

|  | Contents |
| --- | --- |
| Determination Condition 1 | Elapsed time t − (seq * 20 ms) > Threshold 1 |
| Determination Condition 2 | As to last-received N IP packets, Time t − (seq * 20 ms) > Threshold 2 is satisfied m times or more |
| Determination Condition 3 | As to last-received N IP packets, Time t v (seq * 20 ms) > Threshold 3 is satisfied k times or more |
| Determination Condition 4 | Reception intervals of last-received N IP packets > Threshold 4 |

The main controller 111 switches the network for the uplink from the radio IP network 10A to the radio IP network 10B when the determination conditions shown in Table 2 are satisfied by use of "communication quality deterioration level 2" (second communication quality deterioration condition) shown in Table 1. Note that, "seq" shown in Table 2 is a sequence number of an RTP (real-time transport protocol) included in the VoIP packets.

In addition, the main controller 111 transmits a communication quality deterioration notification showing that the communication quality of the uplink is deteriorated to the MN 300, when the determination conditions shown in Table 2 are satisfied by use of "communication quality deterioration level 1" (first communication quality deterioration condition) shown in Table 1. Note that, the MN 300 which received the communication quality deterioration notification cancels the dormant state of the radio communication card 303 (refer to FIG. 3) for the radio IP network 10B. Or, the MN 300 drives (turns on the power) the radio communication card 303 for the radio IP network 10B.

In addition, as shown in FIG. 9, the controller 111 can set different values of threshold 1 to threshold 4, N, M, and K for each radio IP network. This is because the level (communication quality deterioration level 2) to be determined as the communication quality being deteriorated and the level (communication quality deterioration level 1) used for canceling the dormant state of the radio communication card 303 or used for driving the radio communication card 303 are different for each of the radio IP networks.

In addition, when it is determined that the network for the uplink is to be switched from the radio IP network 10A to the radio IP network 10B, the main controller 111 transmits, to the MN 300, a communication path switching instruction (uplink switching instruction) instructing the switch of the network for the uplink from the radio IP network 10A to the raid IP network 10B. In this embodiment, the main controller 111 constitutes an uplink switching instruction transmitter.

Furthermore, the main controller 111 receives, from the MN 300, a communication path switching instruction (downlink switching instruction) instructing the switch of the network for the downlink from the radio IP network 10A to the radio IP network 10B. In this embodiment, the communication interface unit 101 and the main controller 111 constitute a downlink switching instruction receiver. Note that, the communication path switching instruction is transmitted and received by use of an access control packet (refer to FIG. 8(b)). Table 3 shows one example of the contents of the access control packets transmitted from the MN 300 to the switching server 100. In addition, Table 4 shows one example of the contents of the access control packets transmitted, from the switching server 100 to the MN 300.

TABLE 3

Access Control Packet (MN 300 to Switching Server 100)

| Type | Control Code | Processing Content |
| --- | --- | --- |
| Communication Quality Deterioration Notification | 0x11 | Notify switching server that MN detected communication quality deterioration level 1 |
| Communication Path Switching Instruction | 0x22 | Instruct switching server to switch network for downlink when MN detected communication quality deterioration level 2 |
| Copy Reply Request | 0x31 | To be sent from MN to switching server using specified payload with control code 0x32 |
| Communication Path Switching Instruction Response | 0x28 | Response to communication path switching instruction from switching server |
| Communication Quality Deterioration Notification Response | 0x15 | Response to communication quality deterioration notification to switching server |

TABLE 4

Access Control Packet (Switching Server 100 to MN 300)

| Type | Control Code | Processing Content |
| --- | --- | --- |
| Communication Path Switching Instruction Response | 0x24 | Response to communication path switching instruction from MN |
| Copy Response | 0x32 | Response to control code 0x31 |
| Communication Quality Deterioration Notification | 0x14 | Notify MN that switching server detected communication quality deterioration level 1 (MN cancels dormant state of radio communication card for destination to which radio IP network is switched on the basis of received communication quality deterioration notification. MN also transmits copy reply request to switching server and checks state of destination to which radio IP network is switched) |
| Communication Path Switching Instruction | 0x26 | When switching server detected communication quality deterioration level 2, instruct MN to switch network for uplink |
| Communication Quality Deterioration Notification Response | 0x12 | Response to communication quality deterioration notification from MN |

Note that, the control code is expressed by use of the first 1-byte of the payload portions (refer to FIG. 8(b)) of the access control packets. Furthermore, a home IP address AH of the MN 300 may be added subsequent to the control code. The switching server 100 transmits the access control packets (response packets) shown in Table 2 to the MN 300 when the access control packets with the contents shown in Table 1 are received from the MN 300.

In addition, the main controller 111 switches the network for the downlink from the radio IP network 10A to the radio IP network 10B on the basis of the communication path switching instruction (downlink switching instruction) received from the MN 300. In this embodiment, the main controller 111 constitutes a downlink switching unit. Note that, the main controller 111 can switch the network for the downlink from the radio IP network 10A to the radio IP network 10B while the silent state of the downlink is being detected by the silence detector 107.

Furthermore, the main controller 111 can change the codec used when the network for the downlink is switched to the radio IP network 10B. Specifically, the main controller 111 can change the codec from G.729 (first voice encoding protocol) used in the radio IP network 10A to G.711 (second voice encoding protocol).

In addition, the main controller 111 checks the order of the IP packets received via the radio IP network 10A and the radio IP network 10B. In this embodiment, the main controller 111 checks the sequence number (seq) of the RTP included in the VoIP packets which are transmitted and received between the MN 300 and the IP phone terminal 42.

The storage unit 113 stores an application program that provides a function of the switching server 100, or the like. In addition, the storage unit 113 stores information related to networks such as the radio IP network 10A and the radio IP network 10B.

In particular, the storage unit 113 stores a home IP address AH of the MN 300, which is associated with, the care of IP address A1 and the care of IP address A2 in this embodiment. Specifically, the main controller 111 causes the storage unit 113 to store the care of IP address A1, the care of IP address A2 and the home IP address AH which are notified by the MN 300.

Note that the main controller 111 is capable of verifying the home IP address AH included in an IP packet transmitted from the IP phone terminal 42 with a home IP address registered to a home agent (not shown) accessible via the Internet 20. Through the verification performed by the main controller 111, determination can be made as to which carrier has assigned the home IP address AH to the MN 300.

(2) MN 300

Figure 3:
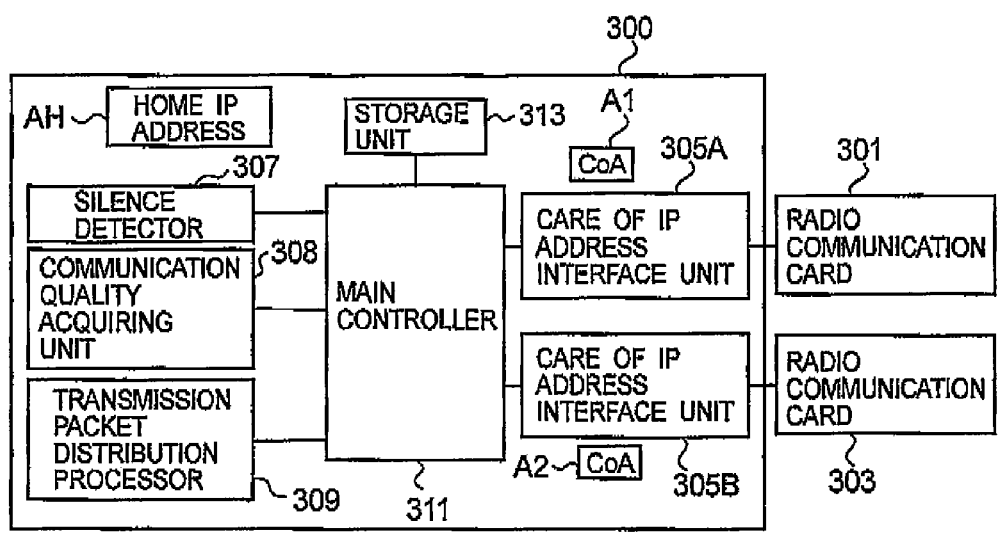
FIG. 3 shows a functional block configuration diagram of a radio communication device according to the embodiment of the present invention.

FIG. 3 shows a functional block configuration diagram of the MN 300. Similarly to the switching server 100, the MN 300 is capable of executing communications while simultaneously using the radio IP network 10A and the radio IP network 10B. Here, the description of the same functional blocks as those of the aforementioned switching server 100 will be omitted as appropriate in the description below.

As shown in FIG. 3, the MN 300 includes a radio communication card 301, a radio communication card 303, a care of IP address interface unit 305A, a care of IP address interface unit 305B, a silence detector 307, a communication quality acquiring unit 308, a transmission packet distribution processor 309, a main controller 311 and a storage unit 313.

The radio communication card 301 executes radio communications compliant with a radio communication scheme (HRPD, which is a 3GPP2 standard) used in the radio IP network 10A. In this embodiment, the radio communication card 301 constitutes a first radio communication unit that transmits, to the switching server 100 via the radio IP network 10A, the IP packets including the care of address A1 to the IP phone terminal 42.

The radio communication card 303 executes radio communications compliant with the radio communication scheme (mobile WiMAX) used in the radio IP network 10B, In this embodiment, the radio communication card 303 constitutes a second radio communication unit that transmits, to the switching server 100 via the radio IP network 10B, the IP packets including the care of IP address A2 to the IP phone terminal 42.

In addition, in this embodiment, at least the radio communication card 303 can be set in a dormant state in which transmission and reception of radio signals are stopped at timing other than predetermined timing. The radio communication card 303 set in the dormant state operates at predetermined intervals and receives control data transmitted from a radio base station (unillustrated), and the like. Power supply to the radio communication card 303 is stopped during a period other than the period of receiving the data.

The care of IP address interface unit 305A is connected to the radio communication card 301. The care of IP address interface unit 305A transmits and receives IP packets on the basis of a care of IP address A1 assigned to the MN 300 in the radio IP network 10A.

The care of IP address interface unit 305B is connected to the radio communication card 303. The care of IP address interface unit 305B transmits and receives IP packets on the basis of a care of IP address A2 assigned to the MN 300 in the radio IP network 10B.

The silence detector 307 detects a silent state in which communications are not executed in the uplink. In this embodiment, the silence detector 307 constitutes an uplink silence detector.

Specifically, the silence detector 307 detects the silent state on the basis of a volume level of the voice signal before VoIP packets are created according to an RTP or the like.

The communication quality acquiring unit 308 acquires the communication quality of the radio IP network 10A in the downlink. In this embodiment, the communication quality acquiring unit 308 constitutes a downlink communication quality acquiring unit.

Specifically, the communication quality acquiring unit 308 acquires statistical information (for example, throughput, SINR, RSSI, DRC, and transmission power) with regard to the communication quality of the IP packets received via the radio communication card 301. In addition, the communication quality acquiring unit 308 acquires RSSI as statistical information with regard to the communication quality of the IP packets received via the radio communication card 303.

The transmission packet distribution processor 309 executes a processing of distributing the IP packets transmitted from the communication interface unit 101 via the packet relay unit 105 to the radio IP network 10A or the radio IP network 10B.

Specifically, the transmission packet distribution processor 309 creates IP packets including the care of IP address A1 and the home IP address AH and outputs the IP packets on the basis of an instruction from the main controller 311. The IP packets including the care of IP address A1 and the home IP address AH are transmitted from the radio communication card 301 to the radio IP network 10A. In addition, the transmission packet distribution processor 309 creates IP packets including the care of IP address A2 and the home IP address AH and outputs the IP packets on the basis of an instruction from the main controller 311. The IP packets including the care of IP address A2 and the home IP address AH are transmitted from the radio communication card 303 to the radio IP network 10B.

The main controller 311 controls a communication path for the IP packets transmitted to the switching server 100 and the IP packets received from the switching server 100. In addition, the main controller 311 executes processing of access control packets.

In particular, in this embodiment, the main controller 311 determines whether or hot to switch the network for the downlink from the radio IP network 10A to the radio IP network 10B on the basis of the communication quality of the downlink acquired by the communication quality acquiring unit 308. In this embodiment, the main controller 311 constitutes a downlink switching determination unit.

Specifically, the main controller 311 detects that the communication quality in the radio IP network 10A satisfies "communication quality deterioration level 1" (first communication quality deterioration condition). Accordingly, the following parameters can be selected. Note that, as described above, the communication quality deterioration level 1 is used at the timing of cancelling the dormant state of the radio communication card 303 or driving the radio communication card 303.

(a) $SINR \leq Thresh\_SINR\_x1$
(b) $DRC \leq Thresh\_DRC\_x1$
(c) $Transmission\ Power \geq Thresh\_Tx\_Power\_x1$
(d) $DRC\ Lock \leq Thresh\_DRC\_Lock\_x1$
(e) $RSSI \leq Thresh\_RSSI\_x1$ Here, "x" denotes an identification number of the radio IP network, and "1" denotes the communication quality deterioration level 1. As a consequence, although the radio IP network 10A and the radio IP network 10B are used in this embodiment, more radio IP networks may be further used.

The main controller 311 cancels the dormant state of the radio communication card 303 or drives the radio communication card 303 when detecting that the communication quality of the downlink satisfies the communication quality deterioration level 1 (that is, when detecting that the communication quality of the downlink meets the first communication quality deterioration condition).

Note that, as described above, the main controller 311 cancels the dormant state of the radio communication card 303 even when receiving a communication quality deterioration notification from the switching server 100. The main controller 311 receives the communication quality deterioration notification before receiving the communication path switching instruction (uplink switching instruction).

In addition, the main controller 311 can also transmit the communication quality deterioration notification to the switching server 100 when detecting that the communication quality of the downlink satisfies the communication quality deterioration level 1.

Furthermore, the main controller 311 can select the following parameters in order to detect "communication quality deterioration level 2" (second communication quality deterioration condition) in the radio IP network 10A. Note that, as described above, the communication quality deterioration level 2 is used for determining whether or not to switch the network from the radio IP network 10A to the radio IP network 10B. In following the parameters, "2" denotes the communication quality deterioration level 2.

(a) $SINR \leq Thresh\_SINR\_x2$
(b) $DRC \leq Thresh\_DRC\_x2$
(c) $Transmission\ Power \geq Thresh\_Tx\_Power\_x2$
(d) $DRC\ Lock \leq Thresh\_DRC\_Lock\_x2$
(e) $RSSI \leq Thresh\_RSSI\_x2$ As described above, the main controller 311 uses the communication quality deterioration level 1 and the communication quality deterioration level 2. The communication quality deterioration level 2 is used for determining whether or not to switch the network from the radio IP network 10A to the radio IP network 10B in response to the state in which the communication quality is deteriorated more than the communication quality deterioration level 1.

In addition, the main controller 311 can use the following parameter in order to detect "communication quality deterioration level 1" in the radio IP network 10B.

$RSSI \leq Thresh\_RSSI\_y1$

Here, "y" denotes the identification number of radio IP network of the switching destination and "1" denotes the communication quality deterioration level 1. Furthermore, the main controller 311 can use the following parameter in order to detect "communication quality deterioration level 2" in the radio IP network 10B.

$RSSI \leq Thresh\_RSSI\_y2$

In this embodiment, the radio IP network 10B is a radio LAN network compliant with the mobile WiMAX. Accordingly, the main controller 311 can acquires only RSSI. Here, a bandwidth (communication, speed) of the downlink and RSSI are correlated. Thereby, the determination can be made whether or not the communication quality is deteriorated on the basis of the RSSI value. Note that, the main controller 311 can use the parameter even when determining whether or not to switch the network for the downlink from the radio IP network 10B to the radio IP network 10A.

In addition, as shown in FIGS. 10(a) and 10(b), the main controller 311 can set different thresholds (Thresh) for each radio IP network. Note that, FIG. 10(a) shows an example of a radio IP network, such as the radio IP network 10A, capable of using multiple parameters for determining deterioration of the communication quality. FIG. 10(b) shows an example of a radio IP network, such as the radio IP network 10B, capable of using only RSSI for determining deterioration of the communication quality.

In addition, the main controller 311 transmits, to the switching server 100, a communication path switching instruction (downlink switching instruction) to switch the network for the downlink from the radio IP network 10A to the radio IP network 10B when determining to switch the network for the downlink to the radio IP network 10B. In this embodiment, the main controller 311 constitutes a downlink switching instruction transmitter.

Furthermore, the main controller 311 receives, from the switching server 100, a communication path switching instruction (uplink switching instruction) to switch the network for the uplink from the radio IP network 10A to the radio IP network 10B. In this embodiment, the radio communication card 303 and the main controller 311 constitute an uplink switching instruction receiver.

In addition, the main controller 311 switches the network for the uplink from the radio IP network 10A to the radio IP network 10B on the basis of the communication path switching instruction (uplink switching instruction) received from the switching server 100. In this embodiment, the main controller 311 constitutes an uplink switching unit. Note that, the main controller 311 can switch the network for the uplink from the radio IP network 10A to the radio IP network 10B while the silence detector 307 is detecting the silent state in the uplink.

Furthermore, the main controller 311 can change the codec used when switching the network for the uplink to the radio IP network 10B. Specifically, the main controller 311 can change the codec from G.729 (first voice encoding protocol) used in the radio IP network 10A to G.711 (second voice encoding protocol).

The storage unit 313 stores application programs and the like providing functions of the MN 300. In addition, the storage unit 313 stores the home IP address AH of the MN 300, which is associated with the care of IP address A1 and the care of IP address A2.

(Operations of the Communication System)

Next, operations of the above-described communication system will be described. Specifically, operations (1) in a case where deterioration of the communication quality of the downlink is detected in the MN 300 and (2) in a case where deterioration of the communication quality of the uplink is detected in the switching server 100 will be described.

Figure 4:
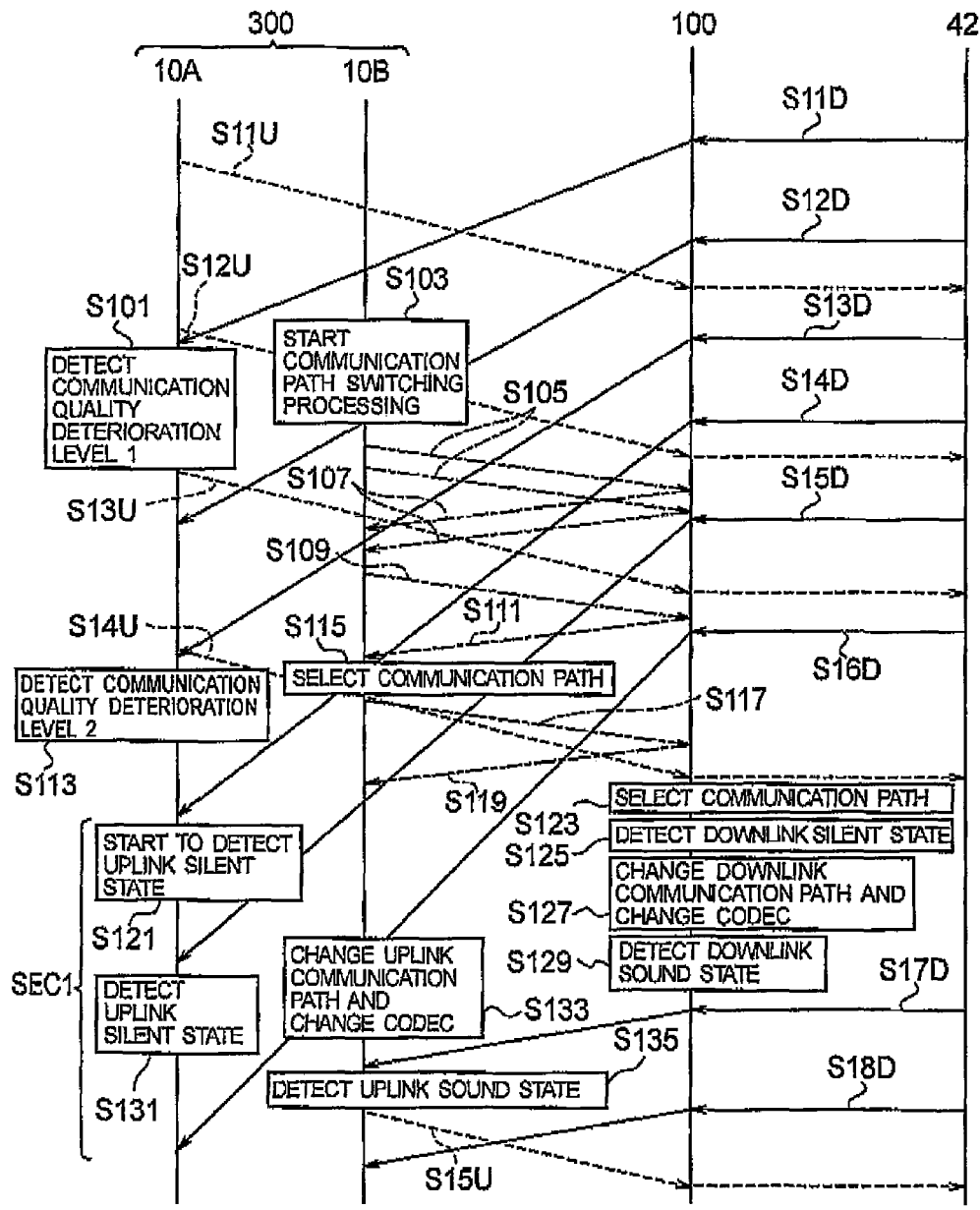
FIG. 4 is a communication sequence diagram executed in the communication system according to the embodiment of the present invention.

(1) The Case where Deterioration of the Communication Quality of the Downlink is Detected FIG. 4 shows a communication sequence diagram in the case where the deterioration of the communication quality of the downlink is detected in the MN 300. As shown in FIG. 4, in steps S11D to S18D, the switching server 100 relays the IP packets transmitted from the IP phone terminal 42 to the MN 300, specifically the IP packets after being processed of encapsulation necessary for transmission in a VPN, or of addition of headers necessary for the VoIP packets (shown by the solid line in the figure).

Meanwhile, in step S11U to step S15U, the MN 300 sequentially transmits the VoIP packets to the switching server 100. The VoIP packets transmitted from the MN 300 to the switching server 100 are sequentially relayed to the IP phone terminal 42 after being processed of decapsulation of the VoIP packets or header change (shown by the dotted line in the figure).

In step S101, the MN 300 detects deterioration of the communication quality in the downlink while such VoIP packets are being transmitted and received. Specifically, the MN 300 detects that the communication quality of the downlink satisfies the communication quality deterioration level 1.

In step S103, the MN 300 starts a "communication path switching processing" of switching the network for the downlink from the radio IP network 10A to the radio IP network 10B. Specifically, the MN 300 having detected that the communication quality deterioration level 1 is satisfied cancels the dormant state of the radio communication card 303 for the radio IP network 10B or drives the radio communication card 303.

In step S105, the MN 300 transmits a communication quality deterioration notification (0x11, refer to Table 3) to the switching server 100 according to the fact that the communication quality of the downlink is satisfied the communication quality deterioration level 1. The communication quality deterioration notification is transmitted via the radio IP network 10B. In the following description, information with regard to the switching of the communication path is transmitted via the radio IP network 10B.

In step S107, the switching server 100 transmits a communication quality deterioration notification response (0x12, refer to Table 4) to the MN 300 on the basis of the reception of the communication quality deterioration notification from the MN 300.

In step S109, the MN 300 transmits a Copy reply request (0x31, refer to Table 3) to the switching server 100.

In step S111, the switching server 100 transmits a Copy response (0x32, refer to Table 4) to the MN 300 on the basis of the reception of the Copy reply request from the MN 300.

When the Copy reply request is received, the switching server 100 transmits the Copy response including the payload as it is, which is included in the Copy reply request, via the radio IP network 10B. By using this way, so-called echo back of the packets, the switching server 100 and the MN 300 execute statistical processing (for example, statistical processing of intervals of receiving the IP packets) of the communication quality of the radio IP network 10B on the basis of the packets. The switching server 100 and the MN 300 can determine whether or not the switch of the network to the radio IP network 10B can be executed on the basis of a result of the statistical processing.

In step S113, the MN 300 detects that the communication quality of the downlink satisfies the communication quality deterioration level 2.

In step S115, the MN 300 selects a destination to which a radio IP network is to be switched. Here, the MN 300 selects the radio IP network 10B.

In step S117, the MN 300 transmits a communication path switching instruction (0x22, refer to Table 3) to the switching server 100.

In step S119, the switching server 100 transmits, to the MN 300, a communication path switching instruction response (0x24, refer to Table 4) on the basis of the reception of the communication path switching instruction from the MN 300.

In step S121, the MN 300 starts detection of a silent state of the uplink. In addition, in step S123, the switching server 100 selects a destination to which a radio IP network is switched. Here, the switching server 100 selects the radio IP network 10B.

In step S125, the switching server 100 detects a silent state of the downlink. In step S127, the switching server 100 switches the network for the downlink from the radio IP network 10A to the radio IP network 10B while the silent state of the downlink is being detected.

In addition, the switching server 100 switches the codec in accordance with the switching the network to the radio IP network 10B, Specifically, the switching server 100 changes G.729 to G.711. Note that, as the codec is switched, information in which a necessary header, such as RTP, is added to the payload transcoded for the codec after changed is transmitted.

In step S129, the switching server 100 detects that the silent state in the downlink is finished as calling parties restart communications, and thus detects a sound state. As a result, the VoIP packets transmitted from the IP phone terminal 42 are transmitted to the MN 300 not via the radio IP network 10A but via the radio IP network 10B (refer to steps S17D and S18D).

In step S131, the MN 300 detects a silent state in the uplink. In step S133, the MN 300 switches the network for the uplink from the radio IP network 10A to the radio IP network 10B while the silent state in the uplink is being detected.

In addition, the MN 300 switches the codec in accordance with the switching the network to the radio IP network 10B. Specifically, the MN 300 changes the codec from G.729 to G.711.

In step S135, the MN 300 detects that the silent state in the uplink is finished as calling parties restart communications, and thus detects a sound state. As a result, the MN 300 transmits the VoIP packets not via the radio IP network 10A but via the radio IP network 10B (refer to step S15U).

Note that, the communication quality of the VoIP packets that the MN 300 receives starts to be deteriorated after the detection has been made in step S113 that the communication quality of the downlink satisfies the communication quality deterioration level 2 up until the network for the downlink is switched to the radio IP network 10B in step S127 (SEC1 in the figure).

In addition, in the above-described communication sequence, the communication path for the uplink is also switched as the communication path for the downlink is switched. However, another configuration may be of course possible in which the communication path for only the downlink with the deterioration of the communication quality being detected is switched.

(2) The Case where Deterioration of the Communication Quality of the Uplink is Detected Next, by referring to FIG. 5 to FIG. 7, operations in a case where deterioration of the communication quality of the uplink is detected in the switching server 100 will be described.

(2.1) Communication Sequence

Figure 5:
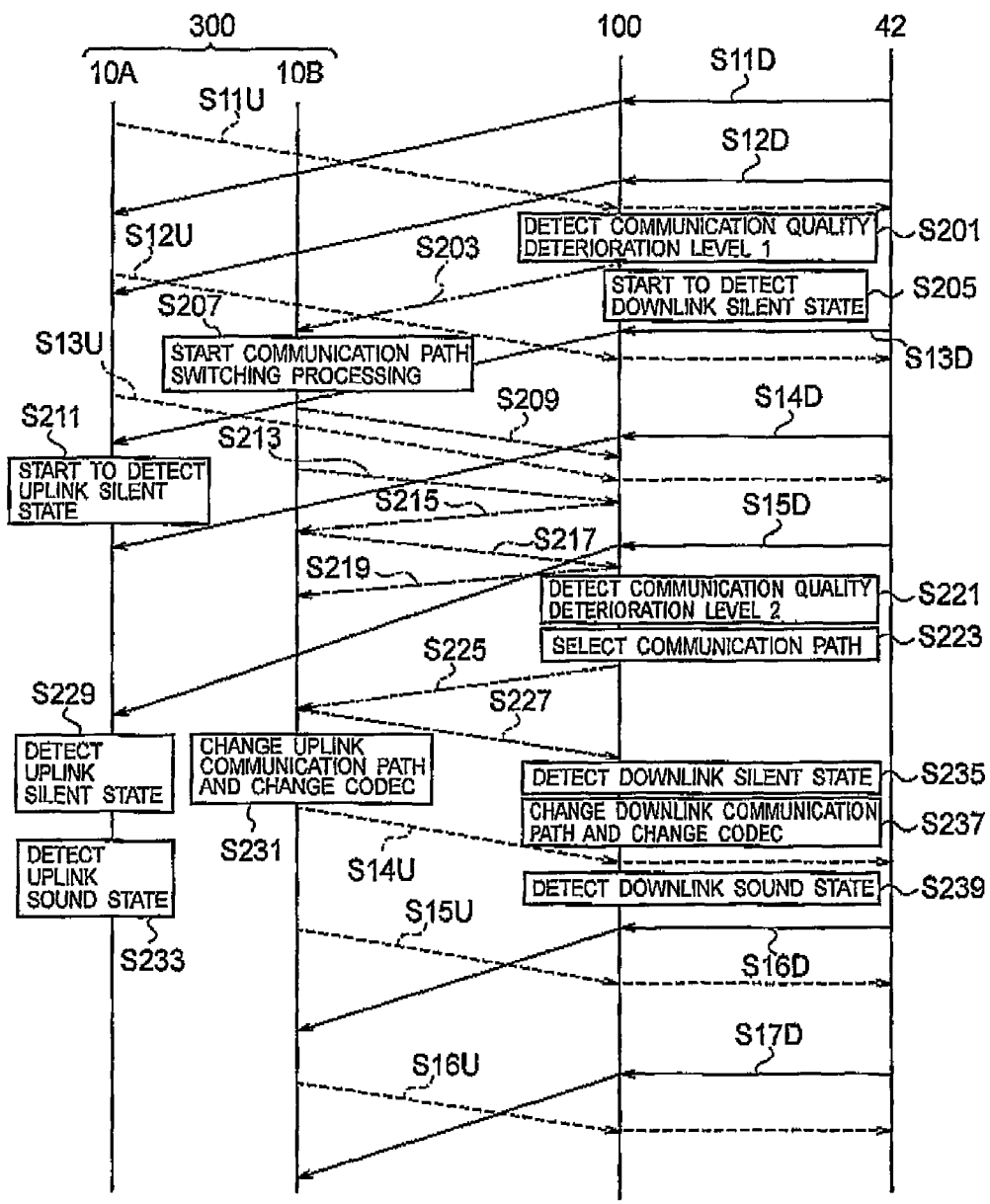
FIG. 5 is a communication sequence diagram executed in the communication system according to the embodiment of the present invention.

FIG. 5 shows a communication sequence diagram in a case where deterioration of the communication quality of the uplink is detected in the switching server 100. Note that, the communication sequence in the case where the deterioration of the communication quality of the uplink is detected in the switching server 100 includes portions similar to those of the above-described communication sequence (refer to, FIG. 4) in the case where the deterioration of the communication quality of the downlink is detected in the MN 300. Accordingly, the description of the similar portions will be omitted as appropriate.

As shown in FIG. 5, in steps S11D to S17D, the switching server 100 sequentially relays the IP packets (VoIP packets) transmitted from the IP phone terminal 42 to the MN 300 (shown by the solid line in the figure). In addition, in step S11D to step S16U, the MN 300 sequentially transmits the VoIP packets to the switching server 100. The VoIP packets transmitted from the MN 300 to the switching server 100 are sequentially relayed by the switching server 100 to the IP phone terminal 42 (shown by the dotted line in the figure).

In step S201, the switching server 100 detects that the communication quality of the uplink satisfies the communication quality deterioration level 1.

In addition, in step S203, the switching server 100 transmits a communication quality deterioration notification (0x14, refer to Table 4) to the MN 300 as the communication quality of the uplink satisfies the communication quality deterioration level 1. The communication quality deterioration notification is transmitted via the radio IP network 10B. In the following description, information on the switching of the communication path will be transmitted via the radio IP network 10B.

In step S205, the switching server 100 starts to detect a silent state of the downlink.

In step S207, the MN 300 starts a communication path switching processing in which the network for the downlink is switched from the radio IP network 10A to the radio IP network 10B on the basis of the communication quality deterioration notification received from the switching server 100, Specifically, the MN 300 cancels the dormant state of the radio communication card 303 for the radio IP network 10B.

In step S209, the MN 300 transmits a communication quality deterioration notification response (0x15, refer to Table 3) to the switching server 100 on the basis of the reception of the communication quality deterioration notification from the switching server 100. In addition, in step S211, the MN 300 starts to detect the silent state of the uplink.

In step S213, the MN 300 transmits a Copy reply request (0x31, refer to Table 3) to the switching server 100. In addition, in step S215, the switching server 100 transmits a Copy response (0x32, refer to Table 4) to the MN 300. Furthermore, in step S217 and step S219, transmission and reception of the Copy reply request and the Copy response are repeated.

In step S221, the switching server 100 detects that the communication quality of the uplink satisfies the communication quality deterioration level 2.

In step S223, the switching server 100 selects a destination to which a radio IP network is to toe switched. Here, the switching server 100 selects the radio IP network 10B.

In step S225, the switching server 100 transmits a communication path switching instruction (0x26, refer to Table 4) to the MN 300.

In step S227, the MN 300 transmits a communication path switching instruction response (0x28, refer to Table 3) to the MN 300 on the basis of the reception of the communication path switching instruction from the switching server 100.

In step S229, the MN 300 detects the silent state of the uplink. In step S231, the MN 300 switches the network for the uplink from the radio IP network 10A to the radio IP network 10B while the silent state of the uplink is being detected. In addition, the MN 300 switches the codec in accordance with the switching the network to the radio IP network 10B.

In step S233, the MN 300 detects that the silent state of the uplink is finished as calling parties restart communications, and thus detects a sound state. As a result, the MN 300 transmits the VoIP packets not via the radio IP network 10A but via the radio IP network 10B (refer to steps S14U, S15U, and S16U).

In step S235, the switching server 100 detects the silent state of the downlink. In step S237, the switching server 100 switches the network for the downlink from the radio IP network 10A to the radio IP network 10B while the silent state is being detected. In addition, the switching server 100 switches the codec in accordance with the switching the network to the radio IP network 10B.

In step S239, the switching server 100 detects that the silent state of the downlink is finished as calling parties restart communications, and thus detects a sound state. As a result, the VoIP packets transmitted from the IP phone terminal 42 are transmitted to the MN 300 not via the radio IP network 10A but via the radio IP network 10B (refer to steps S16D and S17D).

In addition, in the above-described communication sequence, the communication path for the downlink is also switched as the communication path for the uplink is switched. However, a configuration can be of course possible in which the communication path for only the uplink with the deterioration of the communication quality being detected is switched.

(2.2) Processing of Determining Deterioration of the Communication Quality of the Uplink by the Switching Server 100

Next, by referring to FIG. 6, an example of a processing of determining deterioration of the communication quality of the uplink, which is performed by the switching server 100, will be described.

Figure 6:
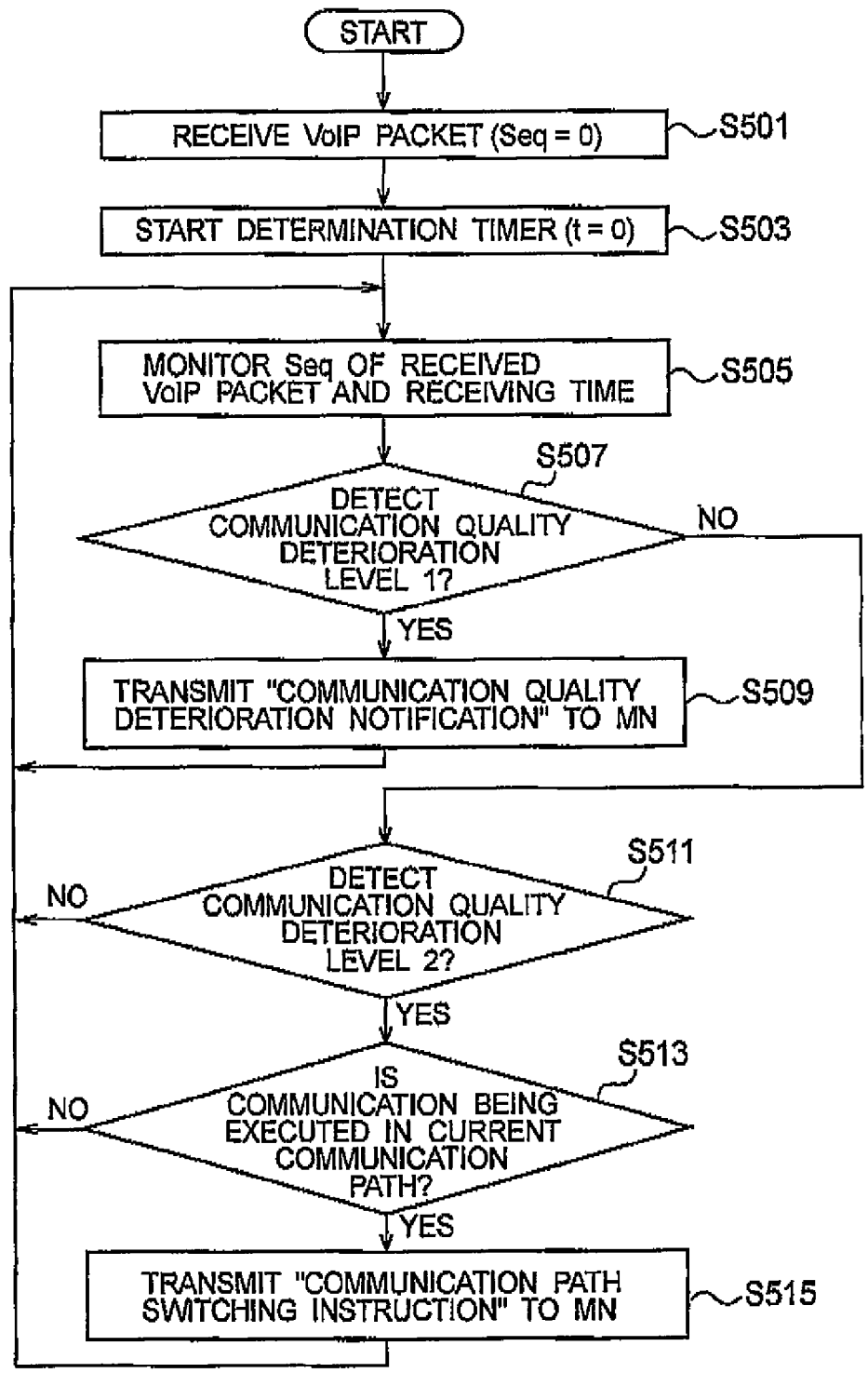
FIG. 6 is a flowchart of a processing of determining deterioration of a communication quality, which is executed in the communication control device according to the embodiment of the present invention.

As shown in FIG. 6, in step S501, the switching server 100 sequentially receives the VoIP packets from the MN 300. Specifically, the switching server 100 firstly receives the VoIP packet with the RTP sequence number (seq) being 0 when the MN 300 and the IP phone terminal 42 start communications (voice communications).

In step S503, the switching server 100 starts a timer to measure intervals of receiving the VoIP packets. In step S505, the switching server 100 monitors the sequence number of the RTP included in the VoIP packets sequentially received from the MN 300 and a time of receiving the VoIP packets.

In step S507, the switching server 100 detects whether or not the communication quality of the uplink satisfies the communication quality deterioration level 1.

When the communication quality deterioration level 1 is satisfied (YES in step S507), the switching server 100 transmits a communication quality deterioration notification (0x14) to the MN 300 in step S509, and repeats the processings from step S505.

When the communication quality deterioration level 1 is not satisfied (NO in step S507), the switching server 100 detects whether or not the communication quality of the uplink satisfies the communication quality deterioration level 2 in step S511.

When the communication quality deterioration level 2 is satisfied (YES in step S511), in step S513, the switching server 100 determines whether or not the communications are being executed in the uplink of the current communication path, that is, the radio IP network 10A.

When the communication quality deterioration level 2 is not satisfied (NO in step S511), the switching server 100 repeats the processings from step S505.

When the communications are being executed in the uplink (YES in step S513), in step S515, the switching server 100 transmits a communication path switching instruction (0x26) to the MN 300.

When the communications are not being executed in the uplink (HO in step S513), the switching server 100 repeats the processings from step S505.

(2.3) Processing of Determining the Silent State of the DOWNLINK by the Switching Server 100

Next, by referring to FIG. 7, an example of the processing of determining the silent state of the downlink, which is performed by the switching server 100, will be described.

Figure 7:
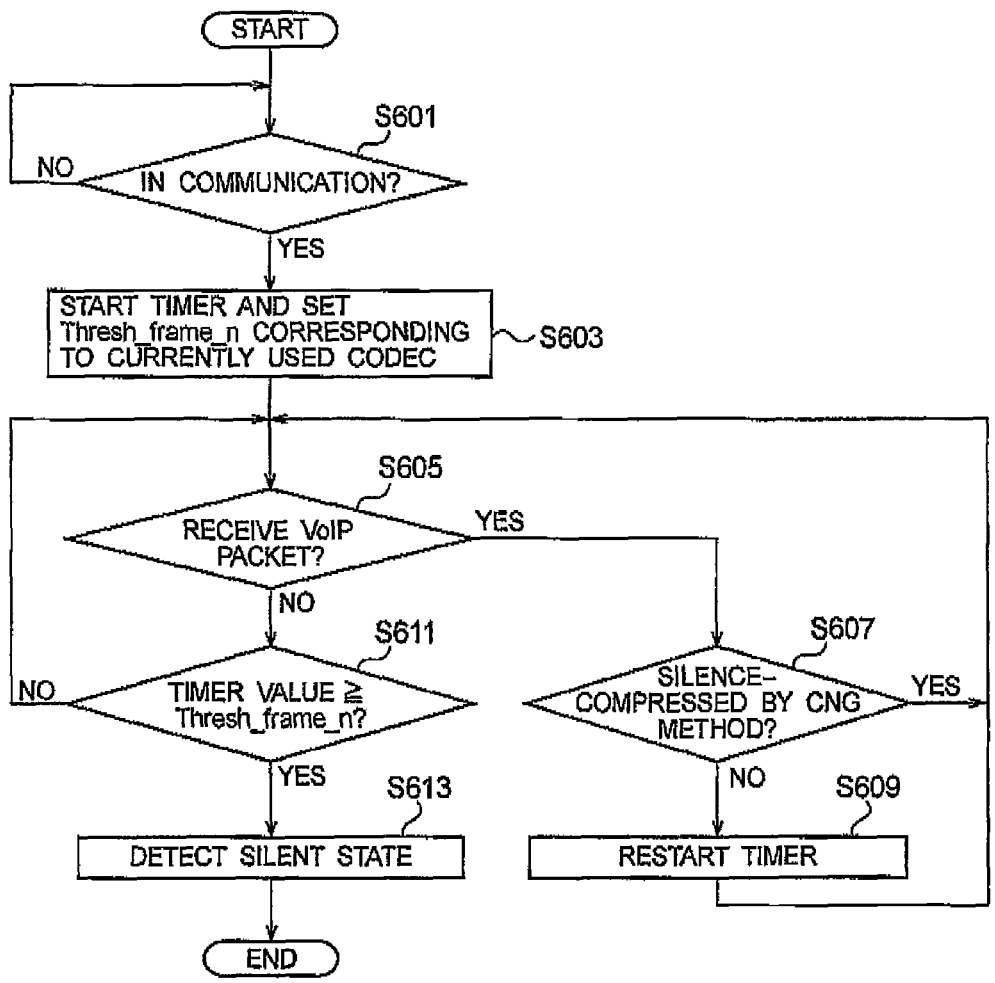
FIG. 7 is a flowchart of a processing of determining a silent state, which is executed in the communication control device according to the embodiment of the present invention.

As shown in FIG. 7, in step S601, the switching server 100 determines whether or not the MN 300 and the IP phone terminal 42 are in communications (voice communications).

When the MN 300 and the IP phone terminal 42 are in communications (YES in step S601), in step S603, the switching server 100 starts a timer and sets a threshold (Thresh_frame_n) for detecting the silent state corresponding to the currently-used codec.

In step S605, the switching server 100 determines whether or not the VoIP packets are received from the IP phone terminal 42.

When the VoIP packets are received from the IP phone terminal 42 (YES in step S605), in step S607, the switching server 100 determines whether or not the received VoIP packets are VoIP packets which are silence-compressed by the CNG method.

When the VoIP packets are not VoIP packets which are silence-compressed by the CNG method (NO in step S607), in step S609, the switching server 100 restarts the timer.

When the VoIP packets are VoIP packets which are silence-compressed by the CNG method (YES in step S607), the switching server 100 repeats the processings from step S605. Therefore, the switching server 100 does not restart the timer.

When the VoIP packets are not received from the IP phone terminal 42 (NO in step S605), in step S611, the switching server 100 determines whether or not the timer value is equal to or larger than the set value Thresh_frame_n.

When the timer value is equal to or larger than the set value Thresh_frame_n (YES in step S611), in step S613, the switching server 100 detects that the downlink is in the silent state.

When the timer value is smaller than the set value Thresh_frame_n (NO in step S611), the switching server 100 repeats the processings from step S605.

Effects and Advantages

According to the switching server 100, only the network for the uplink is switched from the radio IP network 10A to the radio IP network 10B on the basis of the communication quality of the uplink. In addition, the packet relay unit 105 can handle the IP packets including the care of IP address A1 and the IP packets including the care of IP address A2. Accordingly, communications can be executed by simultaneously using both radio IP networks of the radio IP network 10A and the radio IP network 10B.

That is, according to the switching server 100, the network for only one of the uplink and the downlink can be switched to another radio IP network in the case where multiple radio IP networks are used.

According to the switching server 100, the network for the downlink is switched from the radio IP network 10A to the radio IP network 10B while the silent state of the downlink is being detected by the silence detector 107.

Thus, only the network for the downlink can be switched without any effect (for example, disconnection or instantaneous interruption) on voice communications which are being executed between the MN 300 and the IP phone terminal 42. Here, in the conventional method, the network for the uplink and the network for the downlink have to be switched to the same network when switching to another radio network. Accordingly, both of the links have to be in silent states so that the network can be switched without any effect on the executing voice communications. However, considering the characteristics of the voice communications, one of calling parties is generally talking. Thus, the frequency that the both links are in silent states is extremely low. Therefor, in the conventional method, there is a problem that an effect due to the deterioration of the communication quality becomes larger in a stand-by state without executing switching the network until the both links becomes in silent states.

According to the switching server 100, when the network for the downlink is switched from the radio IP network 10A to the radio IP network 10B, the codec (voice encoding protocol) can be switched to the one used in the radio IP network 10B. For this reason, a proper codec can be used depending on characteristics of a destination to which radio IP network is switched. For example, the radio IP network 10B compliant with the mobile WiMAX uses a high-speed communication speed, so that the codec can be easily and promptly changed to a corresponding codec with higher quality.

In addition, the MN 300 can execute the switching of the network for the uplink by a similar method to that of the switching server 100. In other words, according to the communication system 1, the network for only one of the uplink and the downlink can be switched to another radio IP network depending on the communication quality of the uplink or the downlink.

Furthermore, according to the MN 300, the radio communication card 303 for the radio IP network 10B is set in the dormant state until the detection is made that the communication quality deterioration level 1 is satisfied. Accordingly, even though multiple radio communication cards being mounted on, MN 300 can suppress an increase of its power consumption.

Other Embodiments

As described above, the content of the present invention has been disclosed through one embodiment of the present invention. However, the descriptions and the drawings constituting a part of the disclosure should not be construed to limit the present invention. Various alternative embodiments should be obvious to those skilled in the art from this disclosure.

For example, although the communication system 1 includes the radio IP network 10A and the radio IP network 10B, a greater number of radio IP networks may be employed. In addition, a network for only one of the uplink and the downlink may be switched to another radio IP network.

Furthermore, the detection of the silent state and the changing of the codec do not have to be executed. In addition, the radio communication card 303 for MM 300 does not have to be set in the dormant state.

Alternatively, the above-described radio communication card 301 (or, the radio communication card 303) may be, for example, a radio unit embedded in a radio communication device. As described above, the present invention of course include various embodiments which are not described herein. The technical scope of the present invention is thus defined only by invention identifying matters according to the scope of claims appropriate to the descriptions above.

It is to be noted that the entire contents of Japanese Patent Application No. 2006-089135 (filed on Mar. 28, 2006) are incorporated herein by reference.

INDUSTRIAL APPLICABILITY

As described above, a communication control device, a radio communication device, a communication control method, and a radio communication method according to the present invention are effective in radio communications such as mobile communications because network for only one of an uplink and a downlink can be switched to another radio IP network in a case where multiple radio IP networks are used.

The invention claimed is:

1. A communication control device that controls a communication path to a radio communication device by use of a first radio IP network in which a first care of IP address is dynamically assigned to the radio communication device in accordance with a position of the radio communication device, and of a second radio IP network in which a second care of IP address is assigned to the radio communication device, the communication control device, comprising:
    a relay unit configured to receive, from the radio communication device, an IP packet including the first care of IP address and being transmitted to a communication destination via the first radio IP network or an IP packet including the second care of IP address and being transmitted to the communication destination via the second radio IP network differing from the first radio IP network in a radio communication scheme, and to relay the received IP packet to the communication destination;
    an uplink communication quality acquiring unit configured to acquire just an uplink communication quality of the first radio IP network which is from the radio communication device to the communication control device;
    an uplink switching determination unit configured to determine whether or not to switch a network for the uplink from the first radio IP network to the second radio IP network for communication while continuing communication through the downlink of the first radio IP network on the basis of just the uplink communication quality acquired by the uplink communication quality acquiring unit;
    an uplink switching instruction transmitter configured to transmit, to the radio communication device, an uplink switching instruction to switch the network for the uplink from the first radio IP network to the second radio IP network for communication while continuing communication through the downlink of the first radio IP network when the uplink switching determination unit determines that the network for the uplink is to be switched to the second radio IP network; and
    a downlink switching instruction receiver configured to receive, from the radio communication device, a downlink switching instruction to switch a network for the downlink, which is from the communication control device to the radio communication device, from the first radio IP network to the second radio IP network;
    a downlink silence detector configured to detect a silent state in which communications are not executed in the downlink, on the basis of the IP packet received by the relay unit from the communication destination; and
    a downlink switching unit configured to switch the network for the downlink from the first radio IP network to the second radio IP network on the basis of the downlink switching instruction received by the downlink switching instruction receiver, wherein
    the downlink switching unit switches the network for the downlink from the first radio IP network to the second radio IP network while the downlink silence detector is detecting the silent state.

2. The communication control device according to claim 1, wherein
    the first radio IP network uses a first voice encoding protocol for coding a voice signal, and
    the downlink switching unit changes the first voice encoding protocol to a second voice encoding protocol used in the second radio IP network, when the network for the downlink is switched from the first radio IP network to the second radio IP network.

3. A radio communication device executing communications with a communication destination via a communication control device by use of a first radio IP network in which a first care of IP address is dynamically assigned to the radio communication device in accordance with a position of the radio communication device and a second radio IP network in which a second care of IP address is assigned to the radio communication device, the radio communication device comprising:
    a first radio communication unit configured to transmit, to a relay unit of the communication control device via the first radio IP network, an IP packet including the first care of IP address and being addressed to the communication destination;
    a second radio communication unit configured to transmit, to the relay unit of the communication control device via the second radio IP network differing from the first radio IP network in a radio communication scheme, an IP packet including the second care of IP address and being addressed to the communication destination;
    a downlink communication quality acquiring unit configured to acquire just a downlink communication quality of the first radio IP network from the communication control device to the radio communication device;
    a downlink switching determination unit configured to determine whether or not to switch the network for the downlink from the first radio IP network to the second radio IP network for communication while continuing communication through the uplink of the first radio IP network on the basis of just the downlink communication quality acquired by the downlink communication quality acquiring unit; and
    a downlink switching instruction transmitter configured to transmit, to a downlink switching instruction receiver of the communication control device configured to receive, a downlink switching instruction to switch a network for the downlink from the first radio IP network to the second radio IP network for communication while continuing communication through the uplink of the first radio IP network when the downlink switching determination unit determines that the network for the downlink is to be switched to the second radio IP network, wherein a downlink silence detector of the communication control device is configured to detect a silent state in which communications are not executed in the downlink, on the basis of the IP packet received by the relay unit of the communication control device from the communication destination, wherein a downlink switching unit of the communication control device is configured to switch the network for the downlink from the first radio IP network to the second radio IP network on the basis of the downlink switching instruction received by the downlink switching instruction receiver, wherein the downlink switching unit switches the network for the downlink from the first radio IP network to the second radio IP network while the downlink silence detector is detecting the silent state, wherein the radio communication device receives, from an uplink switching instruction transmitter of the communication control device, an uplink switching instruction to switch the network for the uplink from the first radio IP network to the second radio IP network for communication while continuing communication through the downlink of the first radio IP network when an uplink switching determination unit of the communication control device determines that the network for the uplink is to be switched to the second radio IP network, wherein the uplink switching determination unit is configured to determine whether or not to switch a network for the uplink from the first radio IP network to the second radio IP network for communication while continuing communication through the downlink of the first radio IP network on the basis of just an uplink communication quality acquired by an uplink communication quality acquiring unit of the communication control device, wherein the uplink communication quality acquiring unit is configured to acquire just the uplink communication quality of the first radio IP network which is from the radio communication device to the communication control device.

4. The radio communication device according to claim 3, wherein the second radio communication unit is set in a dormant state in which transmission and reception of a radio signal is stopped at timing other than predetermined timing, the downlink switching determination unit determines whether or not to switch the network for the downlink from the first radio IP network to the second radio IP network, by use of a first communication quality deterioration condition, and a second communication quality deterioration condition which is used to determine whether or not to switch from via the first radio IP network to via the second radio IP network, and is corresponding to a state of poorer communication quality than in the first communication quality deterioration condition, and the downlink switching instruction transmitter cancels the dormant state of the second radio communication unit when the downlink switching determination unit determines that the communication quality meets the first communication quality deterioration condition.

5. A radio communication device executing communications with a communication destination via a communication control device by use of a first radio IP network in which a first care of IP address is dynamically assigned to the radio communication device in accordance with a position of the radio communication device and a second radio IP network in which a second care of IP address is assigned to the radio communication device, the radio communication device comprising:

an uplink switching instruction receiver configured to receive, from an uplink switching instruction transmitter of the communication control device, an uplink switching instruction to switch a network for an uplink which is from the radio communication device to the communication control device from the first radio IP network to the second radio IP network differing from the first radio IP network in a radio communication scheme for communication while continuing communication through the downlink of the first radio IP network when an uplink switching determination unit of the communication control device determines that the network for the uplink is to be switched to the second radio IP network, wherein the uplink switching determination unit is configured to determine whether or not to switch a network for the uplink from the first radio IP network to the second radio IP network for communication while continuing communication through the downlink of the first radio IP network on the basis of just an uplink communication quality acquired by an uplink communication quality acquiring unit of the communication control device, wherein the uplink communication quality acquiring unit is configured to acquire just the uplink communication quality of the first radio IP network which is from the radio communication device to the communication control device;

an uplink silence detector configured to detect a silence state in which communications are not executed in the uplink; and an uplink switching unit configured to switch the network for the uplink from the first radio IP network to the second radio IP network on the basis of just the uplink switching instruction received by the uplink switching instruction receiver, wherein the uplink switching unit switches the network for the uplink from the first radio IP network to the second radio IP network for communication while continuing communication through the downlink of the first radio IP network while the uplink silence detector is detecting the silent state;

a radio communication unit configured to transmit, to a relay unit of the communication control device, an IP packet including the first care of IP address and being transmitted to the communication destination via the first radio IP network or an IP packet including the second care of IP address and being transmitted to the communication destination via the second radio IP network, wherein a downlink switching instruction receiver of the communication control device is configured to receive, from the radio communication device, a downlink switching instruction to switch a network for the downlink, which is from the communication control device to the radio communication device, from the first radio IP network to the second radio IP network, wherein a downlink silence detector of the communication control device is configured to detect a silent state in which communications are not executed in the downlink, on the basis of the IP packet received by the relay unit of the communication control device from the communication destination,
    wherein the downlink switching unit of the communication control device is configured to switch the network for the downlink from the first radio IP network to the second radio IP network on the basis of the downlink switching instruction received by the downlink switching instruction receiver of the communication control device,
    wherein the downlink switching unit switches the network for the downlink from the first radio IP network to the second radio IP network while the downlink silence detector is detecting the silent state.

6. The radio communication device according to claim 5, wherein
    the first radio IP network uses a first voice encoding protocol for coding a voice signal, and
    the uplink switching unit changes the first voice encoding protocol to a second voice encoding protocol used in the second radio IP network, when the network for the uplink is switched from the first radio IP network to the second radio IP network.

7. The radio communication device according to claim 6, wherein
    the second radio communication unit is set in a dormant state in which transmission and reception of a radio signal is stopped at timing other than predetermined timing,
    the uplink switching instruction receiver receives a communication quality deterioration notification which is received before the uplink switching instruction is received, and
    the uplink switching unit cancels the dormant state of the second radio communication unit when the uplink switching instruction receiver receives the communication quality deterioration notification.

8. A communication control method for controlling a communication path with a radio communication device by use of a first radio IP network in which a first care of IP address is dynamically assigned to the radio communication device in accordance with a position of the radio communication device and a second radio IP network in which a second care of IP address is assigned to the radio communication device, the communication control method comprising the steps of:
    receiving, from the radio communication device, an IP packet including the first care of IP address and being transmitted to a communication destination via the first radio IP network or an IP packet including the second care of IP address and being transmitted to the communication destination via the second radio IP network differing from the first radio IP network in a radio communication scheme;
    relaying the received IP packet to the communication destination;
    acquiring just an uplink communication quality of the first radio IP network which is from the radio communication device to a communication control device;
    determining whether or not to switch a network for the uplink from the first radio IP network to the second radio IP network for communication while continuing communication through the downlink of the first radio IP network on the basis of just the acquired uplink communication quality;
    transmitting, to the radio communication device, an uplink switching instruction to switch the network for the uplink from the first radio IP network to the second radio IP network when it is determined that the network for the uplink is to be switched to the second radio IP network;
    receiving, from the radio communication device, a downlink switching instruction to switch a network for the downlink, which is from the communication control device to the radio communication device, from the first radio IP network to the second radio IP network;
    detecting a silent state in which communications are not executed in the downlink, on the basis of the IP packet received from the communication destination;
    switching the network for the downlink from the first radio IP network to the second radio IP network on the basis of the downlink switching instruction received; and
    switching the network for the downlink from the first radio IP network to the second radio IP network while detecting the silent state.

9. A radio communication method for executing communications with a communication destination via a communication control device by use of a first radio IP network in which a first care of IP address is dynamically assigned in accordance with a position and a second radio IP network in which a second care of IP address is assigned, the radio communication method comprising the steps of:
    transmitting, to the communication control device via the first radio IP network, an IP packet including the first care of IP address and being addressed to the communication destination;
    transmitting, to the communication control device via the second IP network differing from the first radio IP network in a radio communication scheme, an IP packet including the second care of IP address and being addressed to the communication destination;
    acquiring just a downlink communication quality of the first radio IP network which is from the communication control device to a radio communication device;
    determining whether or not to switch a network for the downlink from the first radio IP network to the second radio IP network for communication while continuing communication through the uplink of the first radio IP network on the basis of just the acquired downlink communication quality;
    transmitting, to the communication control device, a downlink switching instruction to switch the network for the downlink from the first radio IP network to the second radio IP network for communication while continuing communication through the uplink of the first radio IP network when it is determined that the network for the downlink is to be switched to the second radio IP network;
    detecting a silent state in which communications are not executed in the downlink, on the basis of the IP packet received by the communication control device from the communication destination;
    switching the network for the downlink from the first radio IP network to the second radio IP network on the basis of the transmitted downlink switching instruction while detecting the silent state;
    acquiring just an uplink communication quality of the first radio IP network which is from the radio communication device to the communication control device;
    determining whether or not to switch a network for the uplink from the first radio IP network to the second radio IP network for communication while continuing communication through the downlink of the first radio IP network on the basis of just the uplink communication quality acquired; and receiving, from the communication control device, an uplink switching instruction to switch the network for the uplink from the first radio IP network to the second radio IP network for communication while continuing communication through the downlink of the first radio IP network when determining that the network for the uplink is to be switched to the second radio IP network.

10. A radio communication method for executing communications with a communication destination via a communication control device by use of a first radio IP network in which a first care of IP address is dynamically assigned in accordance with a position and a second radio IP network in which a second care of IP address is assigned, the radio communication method comprising the steps of:

acquiring just an uplink communication quality of the first radio IP network which is from the radio communication device to the communication control device;

determining whether or not to switch a network for the uplink from the first radio IP network to the second radio IP network for communication while continuing communication through the downlink of the first radio IP network on the basis of just the uplink communication quality acquired;

receiving, from the communication control device, an uplink switching instruction to switch a network for an uplink for communication while continuing communication through the downlink of the first radio IP network, which is from the radio communication device to the communication control device, from the first radio IP network to the second radio IP network differing from the first radio IP network in a radio communication scheme when determining that the network for the uplink is to be switched to the second radio IP network;

detecting a silent state in which communications are not executed in the uplink;

switching the network for the uplink from the first radio IP network to the second radio IP network for communication while continuing communication through the downlink of the first radio IP network on the basis of just the received uplink switching instruction while the silent state is being detected;

transmitting an IP packet including the first care of IP address and being transmitted to the communication destination via the first radio IP network or an IP packet including the second care of IP address and being transmitted to the communication destination via the second radio IP network;

receiving, from the radio communication device, a downlink switching instruction to switch a network for the downlink, which is from the communication control device to the radio communication device, from the first radio IP network to the second radio IP network;

detecting a silent state in which communications are not executed in the downlink, on the basis of the IP packet received by the communication control device from the communication destination; and switching the network for the downlink from the first radio IP network to the second radio IP network on the basis of the downlink switching instruction received by the communication control device while detecting the silent state.

* * * * *